(12) United States Patent
Hosogi et al.

(10) Patent No.: US 8,652,991 B2
(45) Date of Patent: Feb. 18, 2014

(54) TUNGSTEN OXIDE PHOTOCATALYST AND METHOD FOR PRODUCING THE SAME

(75) Inventors: Yasuhiro Hosogi, Toyama (JP); Yasushi Kuroda, Toyama (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 13/704,267

(22) PCT Filed: May 23, 2012

(86) PCT No.: PCT/JP2012/063827
§ 371 (c)(1),
(2), (4) Date: Dec. 14, 2012

(87) PCT Pub. No.: WO2012/169390
PCT Pub. Date: Dec. 13, 2012

(65) Prior Publication Data
US 2013/0095998 A1 Apr. 18, 2013

(30) Foreign Application Priority Data
Jun. 7, 2011 (JP) ................. 2011-126842

(51) Int. Cl.
*B01J 23/00* (2006.01)
(52) U.S. Cl.
USPC ........... 502/309; 502/318; 423/610; 423/604; 423/606; 423/593.1
(58) Field of Classification Search
USPC .................. 502/309, 318; 423/610, 604, 606, 423/593.1; 977/779, 811, 892
See application file for complete search history.

(56) References Cited

U.S. PATENT DOCUMENTS

| 4,113,658 | A  | 9/1978 | Geus |
| 8,017,238 | B2 | 9/2011 | Ohtani et al. |
| 2008/0119352 | A1 | 5/2008 | Kitaguchi |
| 2011/0005916 | A1 | 1/2011 | Hashimoto et al. |

FOREIGN PATENT DOCUMENTS

| EP | 2 072 119 A1 | 6/2009 |
| EP | 2 248 586 A1 | 11/2010 |
| JP | 2007-98294 A | 4/2007 |
| JP | 2008-149312 A | 7/2008 |
| JP | 2009-160566 A | 7/2009 |
| JP | 2009-226299 A | 10/2009 |
| JP | 2011-20009 A | 2/2011 |

*Primary Examiner* — Kaj K Olsen
*Assistant Examiner* — Pritesh Darji
(74) *Attorney, Agent, or Firm* — Sughrue Mion, PLLC

(57) ABSTRACT

The present invention relates to a method for producing a tungsten oxide photocatalyst having titanium oxide and copper ion supported thereon, comprising dissolving urea in a solution in which copper-ion supporting tungsten oxide particles are uniformly dispersed in a titanium oxide sol, thermally decomposing the urea to thereby allow the titanium oxide to precipitate on the surface of copper ion-supporting tungsten oxide and to be supported thereon; and a tungsten oxide photocatalyst modified by both titanium oxide and copper ion obtained by the method, wherein the rate of change of diffuse reflectivity (at wavelength of 700 nm) is less than 3% before and after the irradiation of ultraviolet and the titanium oxide is supported on the tungsten oxide in an island shape of 1 to 100 nm in size.
The tungsten oxide photocatalyst having titanium oxide and copper ion supported thereon of the present invention exhibits high catalyst activity under visible light irradiation.

10 Claims, 2 Drawing Sheets

TUNGSTEN OXIDE PHOTOCATALYST AND METHOD FOR PRODUCING THE SAME

CROSS REFERENCE TO RELATED APPLICATIONS

This application is a National Stage of International Application No. PCT/JP2012/063827 filed May 23, 2012, claiming priority based on Japanese Patent Application No. 2011-126842 filed Jun. 7, 2011, the contents of all of which are incorporated herein by reference in their entirety.

TECHNICAL FIELD

The present invention relates to a tungsten oxide photocatalyst having titanium oxide and copper ion supported thereon and a method for producing the same. Specifically, the present invention relates to a tungsten oxide photocatalyst having titanium oxide and copper ion supported thereon having high catalyst activity under irradiation of visible light having wavelength of 400 nm or more, which maintains catalyst performance over a long time without change in color and is useful for combating bacteria and viruses, eliminating odors, deodorizing, purifying air, cleaning up water and the like; and a method for producing the same.

BACKGROUND ART

Titanium oxide is a material which is widely known as a photocatalyst, but almost nonfunctional in a place without ultraviolet rays. Therefore, extensive research has been conducted on a tungsten oxide photocatalyst which can use visible light.

A photocatalyst using tungsten oxide particles singly generates holes in a valence band and electrons in a conductive band, respectively, by light excitation under irradiation of visible lights. However, since the conductive band has an energy level lower than a redox potential, the oxygen cannot be reduced with the electrons excited in the conductive band and the generation of active oxygen species is not sufficient. As a result, the photocatalyst does not show photocatalyst activity in an environment under visible light irradiation.

Accordingly, in an attempt to improve the catalyst activity under visible light irradiation, a catalyst having cocatalyst supported on the surface of tungsten oxide has been proposed. For example, a catalyst supporting platinum can show photocatalyst activity under visible light irradiation (JP-A-2009-160566 (U.S. Pat. No. 8,017,238); Patent Document 1). However, noble metals such as platinum have a problem of high costs due to their scarcity. On the other hand, a tungsten oxide photocatalyst having relatively-inexpensive copper supported thereon as copper ion or copper oxide has been proposed (JP-A-2008-149312; Patent Document 2, JP-A-2009-226299 (U.S. Patent Publication No. 2011/005916 A1); Patent Document 3).

An attempt to combine a tungsten oxide catalyst with the other photocatalysts has also been made in order to improve the photocatalyst activity. For example, it has been disclosed that a catalyst combining nitrogen-doped titanium oxide and tungsten oxide and a catalyst combining titanium oxide supporting iron oxide and zeolite supporting tungsten oxide (photocatalyst body) show high photocatalyst activity (JP-A-2007-98294 (U.S. Patent Publication No. 2008/0119352); Patent Document 4). Furthermore, a photocatalyst body has also been proposed which allows titanium oxide to coexist with tungsten oxide and has electron-withdrawing material or a precursor thereof containing at least one metal atom selected from Cu, Pt, Au, Pd, Ag, Fe, Nb, Ru, Ir, Rh and Co supported on at least either of titanium oxide and tungsten oxide (JP-A-2011-20009; Patent Document 5). However, since two kinds of photocatalysts are mixed by simple kneading by a dry or wet method in the photocatalyst bodies of Patent Documents 4 and 5, it is difficult to mix nanoparticles of titanium oxide and tungsten oxide uniformly at nanoscale. As a result, high catalyst activity has not been attained with respect to the catalysts of the documents.

Photocatalysts undergo changes in color in some cases when they are used under light irradiation due to the degradation of the catalyst itself or aggregation of the metal particles of the cocatalyst, and some measures should be taken to prevent it.

PRIOR ART

Patent Documents

[Patent Document 1] JP-A-2009-160566 (U.S. Pat. No. 8,017,238)
[Patent Document 2] JP-A-2008-149312
[Patent Document 3] JP-A-2009-226299 (U.S. Patent Publication No. 2011/0005916)
[Patent Document 4] JP-A-2007-98294 (U.S. Patent Publication No. 2008/0119352)
[Patent Document 5] JP-A-2011-20009

DISCLOSURE OF THE INVENTION

Problems to be Solved by the Invention

In a composite catalyst of tungsten oxide and titanium oxide, it is necessary to support titanium oxide on tungsten oxide in a highly-dispersed state in order to exert high activity. The simple kneading by a dry or wet method is likely to lead to a non-uniform mixed state, and as a result, has a problem that a photocatalyst having high activity cannot be obtained. Also, when a photocatalyst is used for a long time under light irradiation, there is a problem that the photocatalyst undergoes changes in color due to the degradation of the catalyst itself or aggregation of the metal particles of the cocatalyst.

Accordingly, there is a growing demand for development of a composite catalyst of titanium oxide and tungsten oxide which is high producing, has high photocatalyst activity under visible light irradiation and undergoes little color change.

Under such circumstance, an objective of the present invention is to provide a composite photocatalyst of titanium oxide and tungsten oxide, which is high producing, undergoes little color change under conditions of use and exhibits high catalyst activity under visible light irradiation; and a method for producing the same.

As a result of intensive studies to achieve the above-mentioned objectives, the present inventors have found that in the production of a tungsten oxide photocatalyst having copper ion and titanium oxide supported thereon by making a composite of copper ion-supporting tungsten oxide particles and titanium oxide, it is possible to support titanium oxide in a highly dispersed state uniformly onto tungsten oxide by allowing urea to coexist in the titanium oxide sol and subjecting the urea to hydrolysis treatment by heating, and to efficiently produce a tungsten oxide photocatalyst having titanium oxide and copper ions supported thereon, which has increased the catalyst activity under visible light irradiation by two to four times than conventional catalysts, and undergoes little color change under conditions of use. The present inventors have accomplished the present invention based on this finding.

In the present invention, a photocatalyst means a substance which possesses the property of a semiconductor, produces holes and electrons by absorption of light wider than the band gap, and performs catalytic action as a result that these holes and electrons are involved in chemical reactions. A cocatalyst means a substance which plays the role of trapping the holes or electrons produced by the photocatalylst, increasing the adsorption amount of the reactive substrate, or lowering the activation energy of the chemical reaction which occurs on the surface of the photocatalyst. Under visible light irradiation at wavelengths 400 nm or longer, titanium oxide does not function as a photocatalyst but only tungsten oxide functions as a photocatalyst, and titanium oxide and copper ion function as a cocatalyst.

That is, the present invention is to provide a method for producing a tungsten oxide photocatalyst having titanium oxide and copper ion supported thereon as in [1] to [5] below and a tungsten oxide photocatalyst having titanium oxide and copper ion supported thereon as in [6] to [10] below.

[1] A method for producing a tungsten oxide photocatalyst having titanium oxide and copper ion supported thereon, comprising dissolving urea in a solution in which copper-ion supporting tungsten oxide particles are uniformly dispersed in a titanium oxide sol, thermally decomposing the urea to thereby allow the titanium oxide to precipitate on the surface of copper ion-supporting tungsten oxide and to be supported thereon.

[2] The method for producing a tungsten oxide photocatalyst having titanium oxide and copper ion supported thereon as described in [1] above, wherein the thermal decomposition of urea is performed at 60 to 95° C.

[3] The method for producing a tungsten oxide photocatalyst having titanium oxide and copper ion supported thereon as described in [1] or [2] above, wherein urea is added in an amount of 5 to 20 parts by mass to 100 parts by mass of the copper ion-supporting tungsten oxide particles.

[4] The method for producing a tungsten oxide photocatalyst having titanium oxide and copper ion supported thereon as described in any one of [1] to [3] above, wherein the titanium oxide sol is a water dispersed titanium oxide sol produced by mixing an aqueous solution of titanium tetrachloride and hot water of 60° C. or higher and hydrolyzing the mixture.

[5] The method for producing a tungsten oxide photocatalyst having titanium oxide and copper ion supported thereon as described in any one of [1] to [4] above, wherein the titanium oxide is supported on the tungsten oxide in an island shape of 1 to 100 nm in size.

[6] A tungsten oxide photocatalyst having titanium oxide and copper ion supported thereon, which is obtained by dispersing copper ion-supporting tungsten oxide particles in a titanium oxide sol containing urea and thermally decomposing the urea to thereby allow the titanium oxide to be supported uniformly on the surface of copper ion-supporting tungsten oxide, wherein the rate of change of diffuse reflectivity (at wavelength of 700 nm) is less than 3% before and after the irradiation of ultraviolet at center wavelength of 365 nm in air with irradiance of 1 mW/cm$^2$ for 72 hours.

[7] The tungsten oxide photocatalyst having titanium oxide and copper ion supported thereon as claimed in claim 6, wherein the support quantity of the copper ion is preferably 0.01 to 0.06 parts by mass in terms of metal (Cu) to 100 parts by mass of tungsten oxide.

[8] The tungsten oxide photocatalyst having titanium oxide and copper ion supported thereon as described in [6] or [7] above, wherein the mass ratio between titanium oxide and copper ion-supporting tungsten oxide is 1:99 to 20:80.

[9] The tungsten oxide photocatalyst having titanium oxide and copper ion supported thereon as described in any one of [6] to [8] above, wherein the type of the titanium oxide crystal is an anatase type or brookite type.

[10] The tungsten oxide photocatalyst having titanium oxide and copper ion supported thereon as described in any one of [6] to [9] above, wherein the titanium oxide is supported on the tungsten oxide in an island shape of 1 to 100 nm in size.

Effects of the Invention

The present invention can provide a tungsten oxide photocatalyst having titanium oxide and copper ion supported thereon, which exhibits high catalyst activity under visible light irradiation and undergoes little change in color under conditions of use, with high productivity.

MODES FOR CARRYING OUT THE INVENTION

Figure 1:
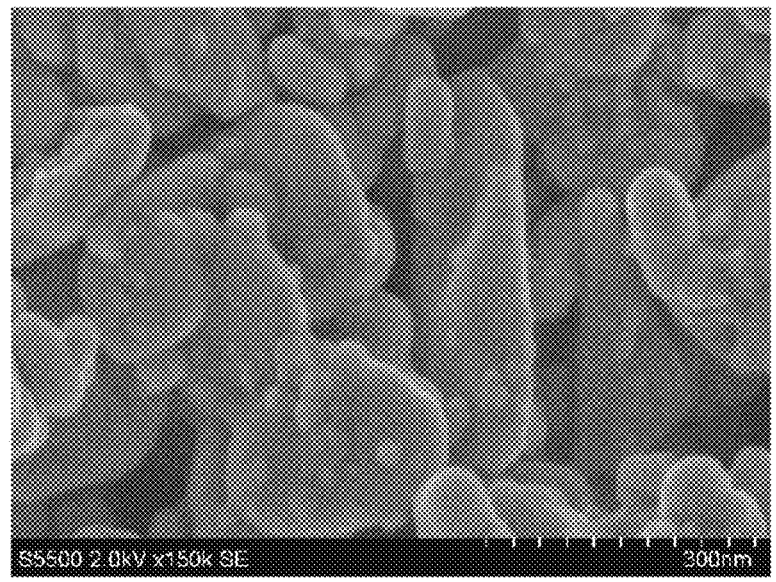
FIG. 1 The secondary electron image with a scanning electron microscope of the tungsten oxide photocatalyst supporting titanium oxide and copper ion of Example 1

Hereinafter, the method for producing a tungsten oxide photocatalyst having titanium oxide and copper ion supported thereon of the present invention is to be described in details.

The method for producing a tungsten oxide photocatalyst having titanium oxide and copper ion supported thereon of the present invention comprises a step of forming a composite of copper ion-supporting tungsten oxide and titanium oxide by changing a titanium oxide sol which is a weakly acidic solution containing copper-ion supporting tungsten oxide particles dispersed therein to a weakly basic solution (step of forming a composite) and a subsequent step of solid-liquid separation by centrifugal filtration and the like (dehydration step).

Step of Forming a Composite:

[Step of Supporting Copper Ion]

As tungsten oxide, several oxides in which tungsten has a valence of from 4 to 6 are known. In the present invention, it is preferable to use a particulate $WO_3$. Examples of a method for preparing tungsten oxide particles include a method of heating an aqueous solution of tungstate such as sodium tungstate, calcium tungstate and ammonium tungstate and mixing the solution with hydrochloric acid or nitric acid to obtain tungsten acid, and subjecting the tungsten acid to washing, drying and calcining to thereby obtain tungsten oxide particles. Also, tungsten oxide particles can be obtained by thermally decomposing ammonium tungstate.

As a method for obtaining copper ion-supporting tungsten oxide by modifying tungsten oxide with a copper ion (copper ion supporting step), for example, a method of having a copper ion be supported onto the surface of tungsten oxide by mixing tungsten oxide powder into a polar solvent solution (preferably an aqueous solution) of a bivalent copper salt (e.g. copper chloride, copper acetate, copper sulfate and copper nitrate), preferably copper(II) chloride and subjecting the mixture to drying treatment can be used.

The support quantity of the copper ion is preferably 0.01 to 0.06 parts by mass in terms of metal (Cu), more preferably 0.02 to 0.06 parts by mass and most preferably 0.02 to 0.04 parts by mass to 100 parts by mass of tungsten oxide.

The support quantity of 0.01 parts by mass or more can impart excellent photocatalytic ability to a photocatalyst produced thereof. By adjusting the support quantity to 0.06 parts by mass or less, it prevents copper ion aggregation and decrease in the photocatalytic ability of the photocatalyst produced thereof.

[Treatment Step to Form a Composite]

In the treatment step to form a composite, titanium oxide is supported on the copper-ion supporting tungsten oxide.

As titanium oxide, aqueous titanium oxide, titanium hydroxide, titanic acid, and titanium oxide having an amorphous structure, anatase-type crystal structure, brookite-type crystal structure, rutile-type crystal structure and the like can be used. Among these, preferred is titanium oxide having an anatase-type or brookite-type crystal structure, which is easily-obtainable in the form of fine particles generally having a high specific surface area.

Specifically, after dispersing copper ion-supporting tungsten oxide particles in titanium oxide sol, the pH of the dispersion is changed from a weakly acidic region of about pH 4 to a weakly basic region of about pH 9 to thereby reduce the dispersibility of the titanium oxide, allow it to be adsorbed onto the surface of the tungsten oxide particles, and to form a composite of titanium oxide and tungsten oxide. In the case without changing the pH, a composite of titanium oxide and tungsten oxide will not be formed sufficiently and the obtained composite particles have low activity.

It is important to operate so that the pH in the titanium oxide sol will not vary in some locations and the pH change proceeds uniformly. If a basic substance such as sodium hydroxide, ammonia and ethylenediamine is added to a titanium oxide sol solution in which copper ion-supporting tungsten oxide particles are dispersed, the pH change occurs locally in a manner such that the pH increases only at the sites of addition. As a result, generation of the aggregation comprising titanium oxide only proceeds dominantly, the composite of tungsten oxide and titanium oxide is formed inhomogeneously, and the obtained composite particles have low activity.

As a method for uniformly changing the pH of the whole solution in the present invention, the urea hydrolysis method can be employed. By the decomposition of urea uniformly dissolved in titanium oxide sol, the urea hydrolysis method can change the pH of the solution without localized variation. In addition, the hydrolysis products are ammonium and carbon dioxide and not to become impurities of a photocatalyst, which is desirable. According to such a method, titanium oxide can be supported onto the copper ion-supporting tungsten oxide in a highly dispersed state.

It is desirable to dissolve urea at a temperature from room temperature to 40° C. When the temperature exceeds 40° C., urea is decomposed immediately after the addition.

The temperature of the thermal decomposition of urea is not particularly limited and preferably 60 to 95° C., and more preferably 80 to 95° C. By heating to 60° C. or higher, the thermal decomposition of urea proceeds efficiently, which can promote the rapid pH change of the solution.

The additive amount of urea is not particularly limited and preferably 5 to 20 parts by mass, and more preferably 10 to 15 parts by mass to 100 parts by mass of the copper ion-supporting tungsten oxide particles. Even if urea exists in an amount of more than 20 parts by mass, it will not lead to a significant change in the pH of the solution, and therefore there is no need to add urea in an amount of more than 20 parts by mass. When the urea amount is less than 5 parts by mass, there is little change in the pH of the solution and there will not be sufficient progress in the composite formation.

The composite formation time is preferably 30 minutes or more, and more preferably one hour or more. By the treatment for 30 minutes or more, the composite formation proceeds uniformly. By the treatment for one hour or more, most of the urea is decomposed to carbon dioxide and ammonium, which is desirable because it reduces the impact of the impurities that cause inactivation.

As the titanium oxide for making a composite with the copper ion-supporting tungsten oxide, it is desirable to use particles having a large specific surface area. The specific surface area of the titanium oxide by the BET method is not particularly limited and is preferably 100 $m^2/g$ or more, more preferably 150 $m^2/g$ or more, and most preferably 300 $m^2/g$ or more. When the specific surface area of the titanium oxide particles is 100 $m^2/g$ or more, the titanium oxide is supported on the copper ion-supporting tungsten oxide in a highly dispersed state, and the photocatalyst produced thereof has high activity.

As the titanium oxide dispersion (titanium oxide sol) used in the present invention, a dispersion without using inorganic compounds such as silica and alumina and organic compounds such as hydroxycarboxylic acid is preferably in consideration of the contamination which is a cause of lowering the catalytic activity.

As a method for producing titanium oxide sol, for example, titanium oxide sol (slurry) can be obtained by the hydrolysis of an aqueous solution of titanium chloride and the like. By changing conditions of a solution for the hydrolysis, the titanium oxide can be made into crystals of an arbitrary size and crystal type to thereby obtain a fine particle anatase-type or brookite-type titanium oxide sol having high dispersivity.

The fine particle anatase-type titanium oxide sol having high dispersivity can be produced by mixing an aqueous solution of titanium tetrachloride into water of 80° C. or more within 60 seconds while maintaining the temperature of 80° C. or more and cooling the mixture to lower than 60° C. within 15 minutes in a method for producing titanium oxide sol by the liquid phase hydrolysis of titanium tetrachloride.

The dispersivity of the titanium oxide can be evaluated by coefficient k in the following formula (1) representing the relationship between the average primal particle diameter ($D_{BET}$) calculated from the BET specific surface area and the cumulative 50% volume particle diameter ($D50_{DLS}$) measured by the dynamic light scattering method.

$$D50_{DLS} = k \times D_{BET} \tag{1}$$

When k is less than 5, preferably less than 2 and more preferably less than 1.5, the titanium oxide has very high dispersivity.

The average primal particle diameter ($D_{BET}$) (nm) is calculated from formula (2) as below by measuring the specific surface area S ($m^2/g$) of titanium oxide by the single point BET.

$$D_{BET} = 6000/(S \times \rho) \tag{2}$$

Here, ρ means the density of the titanium oxide (g/cm³). When the titanium oxide mainly comprises anatase-type crystals, it is closely similar to ρ=4.

For the measurement of the average particle diameter by the dynamic light scattering method, after adjusting the solid content concentration of the titanium oxide sol to 2 mass % using a dynamic light scattering method Particle Analyzer (ELSZ-2; manufactured by Otsuka Electronics Co., Ltd.), the pH of the sol is adjusted to 3.5 (at 25° C.) with hydrochloric acid with monitoring by a pH meter (D-51; manufactured by HORIBA, Ltd.) and the particle size distribution can be measured to obtain the cumulative 50% volume particle diameter ($D50_{DLS}$) value.

Brookite-type titanium oxide sol can be obtained by pouring an aqueous solution of titanium tetrachloride into hot water to undergo hydrolysis, controlling the hydrolysis and maturing temperature to 60-100° C., and the drip rate of the aqueous solution of titanium tetrachloride into hot water to 0.6 g/min. to 2.1 g/min.

The brookite-type crystal content can be determined by Rietveld analysis using 10 mass % of nickel oxide as the internal standard. The abundance ratio of each of crystals can be determined by the Rietveld analysis software in X'pert High Score Plus Program by PANalytical Japan.

(2) Dehydration Process:

In the dehydration process, solid-liquid separation of the dispersion after forming the composite of copper ion-supporting tungsten oxide and titanium oxide is performed by filtration and the like. By the process, excessive solvent can be removed to thereby significantly reduce the drying time.

In the solid-liquid separation in the dehydration process, a centrifugal separator is used, and a Sparkler filter, a filter press, a Schneider filter, a solid-liquid separator and the like may also be used. The materials of the filter cloth are not particularly limited, but a cloth having a ventilation rate of 0.05 to 3 cc/cm²/sec. is preferable. The cloth having a ventilation rate of 0.05 cc/cm²/sec. or higher can perform the solid-liquid separation in a rapid manner. Using a rough filter cloth having a ventilation rate exceeding 3 cc/cm²/sec. results in loss increase and is not desirable.

[Tungsten Photocatalyst Supporting Titanium Oxide and Copper Ion]

The tungsten photocatalyst supporting titanium oxide and copper ion of the present invention can be obtained by the above-mentioned production method of the present invention.

That is, the tungsten photocatalyst supporting titanium oxide and copper ion of the present invention is produced by dispersing copper-ion supporting tungsten oxide particles in a titanium oxide sol containing urea, thermally decomposing the urea to thereby allow the titanium oxide to be uniformly supported on the surface of copper ion-supporting tungsten oxide; and is characterized in having a rate of change of diffuse reflectivity (at wavelength of 700 nm) of less than 3% before and after the ultraviolet irradiation in air and showing no variation in color tone. The conditions for ultraviolet irradiation are those as described in Examples.

The above-mentioned rate of change of diffuse reflectivity (Y %) is a value calculated by the following formula (3) in which A % and B % mean the diffuse reflectivity before the ultraviolet irradiation and the diffuse reflectivity after the ultraviolet irradiation, respectively.

$$Y(\%)=[(A-B)/A]\times 100 \quad (3)$$

The reason why the tungsten oxide photocatalyst supporting titanium oxide and copper ion of the present invention has a low rate of change of diffuse reflectivity at wavelength of 700 nm by a spectrophotometer and shows little variation in color tone before and after the ultraviolet irradiation in air is not entirely clear, but is assumed to be due to the chemical etching caused by ammonium which is generated along with the decomposition of urea at the same time of forming the composite of copper ion-supporting tungsten oxide and titanium oxide.

The support quantity of titanium oxide on copper ion-supporting tungsten oxide is preferably 1 to 20 mass %, and more preferably 1 to 15 mass %. The support quantity of 1 mass % or more can impart excellent photocatalytic function to a photocatalyst produced thereof. The support quantity exceeding 20 mass % inhibits light absorption of tungsten oxide in the visible light region, which leads to a reduction in photocatalytic activity.

In the tungsten oxide photocatalyst supporting titanium oxide and copper ion of the present invention, it is desirable that titanium oxide is supported on the copper ion-supporting tungsten oxide in an island shape.

The size of the island is preferably 1 to 100 nm, and more preferably 1 to 50 nm. By supporting titanium oxide in an island shape of 50 nm or less in size, the cocalytic function of titanium oxide can be enhanced. When titanium oxide is supported in an island shape of more than 100 nm in size or in a shape other than an island shape, it decreases the contact area between tungsten oxide and titanium oxide and therefore affects the efficiency of charge transfer. The size and status of the island can be confirmed by observing secondary electron image or reflection electron image by electron microscopy.

The tungsten oxide photocatalyst supporting titanium oxide and copper ion of the present invention exerts excellent catalytic ability under visible light at wavelengths of 420 nm or longer, and can be used not only in powder form but in various forms such as a thin film by resuspending the photocatalyst in composite particle form.

The function of the photocatalyst of the present invention can be confirmed by observation of decrease in the concentration of organic substances and increase in the concentration of carbon dioxide as a oxidative degradation product under light irradiation compared to the concentration in a dark place when the photocatalyst powder and substance which has adverse impact on the environment (e.g. organic compounds such as aldehyde and the like) are present in the reaction system. The functions of the photocatalyst of the present invention are not limited thereto but include functions such as combating bacteria and viruses, eliminating odors, deodorizing, cleaning up the environment such as purifying air and cleaning up water, and the like.

EXAMPLES

Hereinafter, the present invention will be explained in more detail below with reference to Reference Examples, Examples and Comparative Examples, but the present invention is not limited thereto.

The properties of the photocatalyst powder obtained in each of examples are determined according to the methods as described below.

(1) Carbon Dioxide Generation Rate 0.3 g of each of the photocatalyst powders obtained in examples and comparative examples was placed on the glass petri dish having a diameter of 1.5 cm placed in a sealed glass reactor (0.5 liter capacity). The inside of the reactor was substituted with a mixed gas of oxygen and nitrogen of 1:4 in volume ratio; 5.2 μl of water (corresponding to relative humidity of 50% (at 25° C.)) and 5.0 ml of 5.1% acetaldehyde (as a mixed gas with nitrogen at the standard temperature of 25° C. and pressure of 1 atmosphere) were encapsulated in the reactor; and visible light was irradiated from outside the reactor. For the visible light irradiation, a xenon lamp equipped with a filter (trade name: L-42; manufactured by Asahi Techno Glass Co., Ltd.) which filters out ultraviolet rays at wavelength of 400 nm or shorter was used as a light source. The serial measurement of the generation rate of carbon dioxide as an oxidative degradation product of acetaldehyde was performed by gas chromatography. The photocatalyst activity was evaluated by the carbon dioxide emission per hour.

(2) Diffuse Reflectivity

<Ultraviolet Irradiance Conditions>

3 g of the powder of tungsten oxide photocatalyst modified by both titanium oxide and copper ion was placed in a petri dish having the area of base of 36 cm$^2$ and flattened out by pressing with the bottom of a bottle (so that the powder has a thickness of about 3 mm), ultraviolet rays at center wavelength of 365 nm was irradiated in air to the photocatalyst powder in the petri dish with irradiance of 1 mW/cm$^2$ for 72 hours using black light as a light source. The irradiance was measured by LX-1332 manufactured by Custom).

<Conditions for Measuring Diffuse Reflectivity>

The diffuse reflectivity at wavelength of 700 nm was measured before and after the ultraviolet irradiation at center wavelength of 365 nm in air for 72 hours using FL20S BL (model name; manufactured by Hitachi, Ltd.) as black light and the spectrometer with integrating sphere (model name: UV-2400PC; manufactured by Shimadzu Corporation) as a spectrometer to thereby calculate the rate of change of diffuse reflectivity.

Reference Example 1

Preparation of Copper Ion-Supporting Tungsten Oxide 500 g of tungsten oxide (WO$_3$) powder was added to 4 l of aqueous solution of copper chloride (equivalent to 0.1 parts by mass of Cu to 100 parts by mass of WO$_3$). Next, after heating the solution at 90° C. for one hour while stirring, the solution was washed for recovery by suction filtration. After drying at 120° C. a whole day and night, the obtained powder was crashed in an agate mortar to thereby obtain copper ion-supporting tungsten oxide powder (Cu/WO$_3$) supporting 0.04 parts by mass of copper ion.

Here, the copper ion quantity was determined by dispersing Cu/WO$_3$ in HCl to extract copper ion and subjecting the filtrated extraction liquid to the induction coupled plasma (ICP) analysis.

The copper ion quantity can also be determined by X-ray fluorescence (XRF) analysis.

Reference Example 2

Preparation of Brookite-Type Titanium Oxide Sol 690 ml of ion exchange water was poured into a reaction tank equipped with a reflux condenser, heated to 95° C. and maintained at the temperature. While maintaining the rate of stirring at 300 rpm, 60 g of 18 mass % tetrachloride titanium aqueous solution was delivered by drops into the reaction tank at a rate of 1 g/min. The reaction liquid in the reaction tank which began to become cloudy right immediately after the instillation was maintained at the same temperature, further heated after the instillation was completed, and after being maintained at a temperature near to boiling point for 60 minutes, cooled to room temperature. The hydrochloric acid generated by the reaction was removed by an electrodialyzer to thereby obtain water dispersed titanium oxide sol (BET specific surface area of the powder: 167 m$^2$/g, k=1.9).

Reference Example 3

Preparation of Anatase-Type Titanium Oxide Sol 690 ml of ion exchange water was poured into a reaction tank equipped with a stirrer with comb teeth, preheated to 95° C. While maintaining the rate of stirring at 300 rpm, 50 g of 18 mass % tetrachloride titanium aqueous solution at room temperature was delivered by drops into the reaction tank in 30 seconds and mixed and stirred in the reaction tank. The mixture temperature was maintained at 95° C. for four minutes after the addition. The reaction tank was cooled to 50° C. within less than one minute in an ice bath. The hydrochloric acid generated by the reaction was removed by an electrodialyzer to thereby obtain water dispersed titanium oxide sol (BET specific surface area of the powder: 350 m$^2$/g, k=1.1).

Example 1

45 g of tungsten oxide powder supporting 0.04 parts by mass of copper ion obtained in Reference Example 1 was suspended in 500 g of TiO$_2$ sol (5 g in terms of TiO$_2$) obtained in Reference Example 2, 9 g of urea (20 parts by mass to copper ion-supporting tungsten oxide) was added thereto at room temperature, and the suspension was heated to 90° C. and stirred for one hour. Then, after performing liquid-solid separation by a centrifugal, the resultant cake was dried at 120° C. and allowed to cool to room temperature, pulverized in an agate mortar to thereby obtain the tungsten oxide photocatalyst supporting titanium oxide and copper ion of the present invention.

Figure 2:
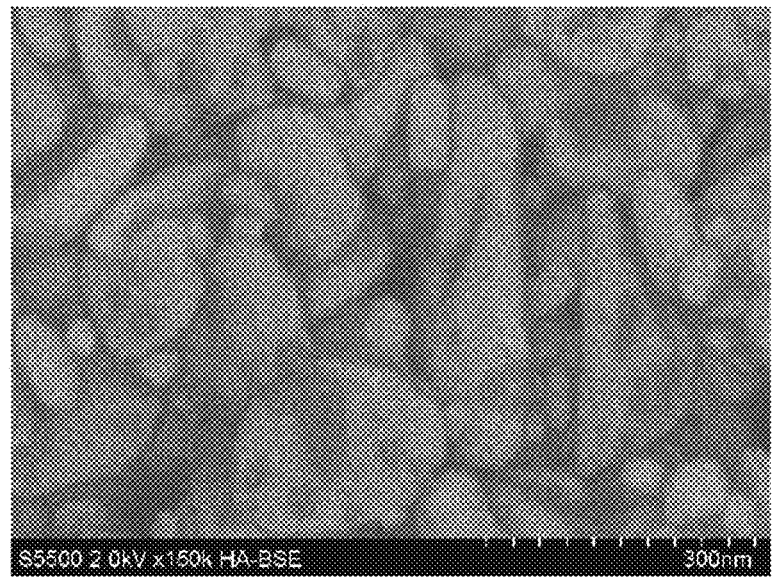
FIG. 2 The reflection electron image of the tungsten oxide photocatalyst supporting titanium oxide and copper ion of Example 1

FIG. 1 shows the secondary electron image with an electron microscope and FIG. 2 shows the reflection electron image of the obtained photocatalyst. The black part in the reflection electron image of FIG. 2 shows titanium oxide, and it can be confirmed from FIG. 1 and FIG. 2 that titanium oxide of 50 nm or less in size is supported on the surface of tungsten oxide in an island shape.

Example 2

45 g of tungsten oxide powder supporting 0.04 parts by mass of copper ion obtained in Reference Example 1 was suspended in 500 g of TiO$_2$ sol (5 g in terms of TiO$_2$) obtained in Reference Example 2, 4.5 g (10 parts by mass) of urea was added thereto at room temperature, and the suspension was heated to 90° C. and stirred for one hour. Then, after performing liquid-solid separation by a centrifugal, the resultant cake was dried at 120° C. and allowed to cool to room temperature, pulverized in an agate mortar to thereby obtain the tungsten oxide photocatalyst supporting titanium oxide and copper ion of the present invention.

Example 3

45 g of tungsten oxide powder supporting 0.04 parts by mass of copper ion obtained in Reference Example 1 was suspended in 500 g of TiO$_2$ sol (5 g in terms of TiO$_2$) obtained in Reference Example 3, 9 g (20 parts by mass) of urea was added thereto at room temperature, and the suspension was heated to 90° C. and stirred for one hour. Then, after performing liquid-solid separation by a centrifugal, the resultant cake was dried at 120° C. and allowed to cool to room temperature, pulverized in an agate mortar to thereby obtain the tungsten oxide photocatalyst supporting titanium oxide and copper ion of the present invention.

Example 4

45 g of tungsten oxide powder supporting 0.04 parts by mass of copper ion obtained in Reference Example 1 was suspended in 500 g of $TiO_2$ sol (5 g in terms of $TiO_2$) obtained in Reference Example 3, 4.5 g (10 parts by mass) of urea was added thereto at room temperature, and the suspension was heated to 90° C. and stirred for one hour. Then, after performing liquid-solid separation by a centrifugal, the resultant cake was dried at 120° C. and allowed to cool to room temperature, pulverized in an agate mortar to thereby obtain the tungsten oxide photocatalyst supporting titanium oxide and copper ion of the present invention.

Example 5

45 g of tungsten oxide powder supporting 0.04 parts by mass of copper ion obtained in Reference Example 1 was suspended in 500 g of $TiO_2$ sol (5 g in terms of $TiO_2$) obtained in Reference Example 2, 2.25 g (5 parts by mass) of urea was added thereto at room temperature, and the suspension was heated to 90° C. and stirred for one hour. Then, after performing liquid-solid separation by a centrifugal, the resultant cake was dried at 120° C. and allowed to cool to room temperature, pulverized in an agate mortar to thereby obtain the tungsten oxide photocatalyst supporting titanium oxide and copper ion of the present invention.

Example 6

42.5 g of tungsten oxide powder supporting 0.04 parts by mass of copper ion obtained in Reference Example 1 was suspended in 750 g of $TiO_2$ sol (7.5 g in terms of $TiO_2$) obtained in Reference Example 2, 9 g (20 parts by mass) of urea was added thereto at room temperature, and the suspension was heated to 90° C. and stirred for one hour. Then, after performing liquid-solid separation by a centrifugal, the resultant cake was dried at 120° C. and allowed to cool to room temperature, pulverized in an agate mortar to thereby obtain the tungsten oxide photocatalyst supporting titanium oxide and copper ion of the present invention.

Comparative Example 1

The tungsten oxide powder supporting 0.04 parts by mass of copper ion obtained in Reference Example 1 was used as a photocatalyst in Comparative Example 1.

Comparative Example 2

45 g of tungsten oxide powder supporting 0.04 parts by mass of copper ion obtained in Reference Example 1 was suspended in 500 g of $TiO_2$ sol (5 g in terms of $TiO_2$) obtained in Reference Example 2, and without the addition of urea, the suspension was heated to 90° C. and stirred for one hour. Then, after performing liquid-solid separation by a centrifugal, the resultant cake was dried at 120° C. and allowed to cool to room temperature, pulverized in an agate mortar to thereby obtain the tungsten oxide photocatalyst supporting titanium oxide and copper ion of Comparative Example 2.

Comparative Example 3

45 g of tungsten oxide powder supporting 0.04 parts by mass of copper ion obtained in Reference Example 1 was suspended in 500 g of $TiO_2$ sol (5 g in terms of $TiO_2$) obtained in Reference Example 2, ammonium was added thereto to change the pH of the suspension to 9, and the suspension was stirred for one hour. Then, after performing liquid-solid separation by a centrifugal, the resultant cake was dried at 120° C. and allowed to cool to room temperature, pulverized in an agate mortar to thereby obtain the tungsten oxide photocatalyst supporting titanium oxide and copper ion of Comparative Example 3.

45 g of tungsten oxide powder supporting 0.04 parts by mass of copper ion obtained in Reference Example 1 was suspended in 500 g of $TiO_2$ sol (5 g in terms of $TiO_2$) obtained in Reference Example 3, and without performing liquid-solid separation, the suspension was allowed to stand to dry at 120° C. and then to cool to room temperature, the resultant was pulverized in an agate mortar to thereby obtain the tungsten oxide photocatalyst supporting titanium oxide and copper ion of Comparative Example 4.

The obtained data regarding the diffuse reflectivity and carbon dioxide generation rate of the photocatalyst powder in the above Examples 1 to 6 and Comparative Example 4 are shown in Table 1.

TABLE 1

| | additive amount of urea (%) | support quantity of $TiO_2$ $Cu/WO_3:TiO_2$ | Analysis value Diffuse reflectivity | | | Carbon dioxide generation rate (Volume ppm/h) |
| --- | --- | --- | --- | --- | --- | --- |
| | | | Before UV irradiation [A] (%) | After UV irradiation [B] (%) | Rate of change [(A − B)/A] × 100 (%) | |
| Example 1 | 20 | 90:10 | 93 | 92 | 1 | 539 |
| Example 2 | 10 | 90:10 | 93 | 92 | 1 | 546 |
| Example 3 | 20 | 90:10 | 93 | 93 | 0 | 380 |
| Example 4 | 10 | 90:10 | 93 | 92 | 1 | 364 |
| Example 5 | 5 | 90:10 | 94 | 92 | 2 | 379 |
| Example 6 | 20 | 85:15 | 95 | 94 | 1 | 371 |
| Comparative Example 1 | 0 | 100:0 | 89 | 84 | 6 | 141 |
| Comparative Example 2 | 0 | 90:10 | 93 | 87 | 6 | 255 |
| Comparative Example 3 | 0 | 90:10 | 93 | 90 | 3 | 261 |
| Comparative Example 4 | 0 | 90:10 | 96 | 92 | 4 | 203 |

As can be seen from the results in the above Table 1, the tungsten oxide photocatalyst supporting titanium oxide and copper ion of the present invention generates carbon dioxide at a rate up to four times higher than the copper ion-supporting tungsten oxide photocatalyst (Comparative Example 1), which apparently shows definite improvement in the photocatalytic activity. Further, it can be seen that the photocatalyst of the present invention shows a very low rate of change of diffuse reflectivity after the ultraviolet irradiation.

Although the catalyst activity is improved in the photocatalysts in Comparative Examples 2 to 4 compared with that in the copper ion-supporting tungsten oxide photocatalyst (Comparative Example 1), the activity increase is less than twice, and the activity improving effect is apparently smaller compared with the photocatalysts of Examples. It is thought to be due to the fact that titanium oxide and tungsten oxide are just in the physically-mixed state in Comparative Examples 2 to 4, and unlike in Examples 1 to 6, titanium oxide is not uniformly adsorbed onto the surface of the tungsten oxide particles.

Exposure to light in the tungsten oxide photocatalyst supporting titanium oxide and copper ion causes diffusion and aggregation of copper ions as well as photoreduction reaction on the surface of the catalyst.

Figure 3:
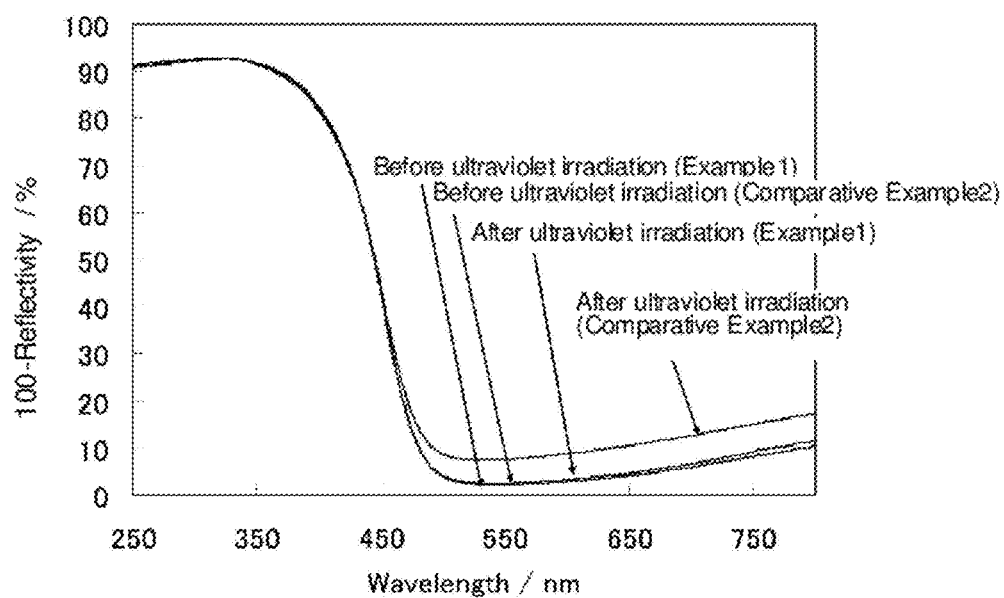
FIG. 3 The diffuse reflection spectrum of the tungsten oxide photocatalyst supporting titanium oxide and copper ion of Example 1 before and after the ultraviolet irradiation and those of the tungsten oxide photocatalyst supporting titanium oxide and copper ion of Comparative Example 2 before and after the ultraviolet irradiation

FIG. 3 shows the diffuse reflection spectrum of the tungsten oxide photocatalyst supporting titanium oxide and copper ion of Example 1 before and after the ultraviolet irradiation, and the diffuse reflection spectrum of the tungsten oxide photocatalyst supporting titanium oxide and copper ion of Comparative Example 2 before and after the ultraviolet irradiation. As can be seen from FIG. 3, the copper ion-supporting tungsten oxide of Comparative Example 2 has the diffuse reflectivity of 93% at wavelength of 700 nm before the ultraviolet irradiation and is bright yellow in color. Meanwhile, the sample of Comparative Example 2 has the diffuse reflectivity of 87% at wavelength of 700 nm after the ultraviolet irradiation and is subdued yellow in color. It is expected that the status change in the surface of the catalyst due to chemical etching by ammonium generated by thermal decomposition of urea causes an effect of inhibiting diffusion and aggregation of copper ions to thereby impart non-photosensitive property to the catalyst. The sample of Example 1 has the diffuse reflectivity of 92% at wavelength of 700 nm even after the ultraviolet irradiation, which is nearly unchanged from the diffuse reflectivity before the light irradiation and shows that the sample has non-photosensitive property. Regarding the actually-observed color, while the sample of Example 1 maintained bright color derived form tungsten oxide, the sample of Comparative Example 2 became subdued yellow color after the irradiation.

It can be seen from the above that the tungsten oxide photocatalyst supporting titanium oxide and copper ion of the present invention undergoes little color change under conditions of use, has high productivity and can exert high catalyst activity under visible light irradiation.

INDUSTRIAL APPLICABILITY

The tungsten oxide photocatalyst supporting titanium oxide and copper ion of the present invention is a photocatalyst which can exert higher catalyst activity under visible light irradiation and is effective in combating bacteria and viruses, eliminating odors, deodorizing, purifying air, cleaning up water and the like.

The invention claimed is:

1. A tungsten oxide photocatalyst having titanium oxide and copper ion supported thereon, which is obtained by dissolving urea in a solution in which copper-ion supporting tungsten oxide particles are uniformly dispersed in a titanium oxide sol, thermally decomposing the urea to thereby allow the titanium oxide to precipitate on the surface of copper ion-supporting tungsten oxide and to be supported thereon, wherein the change of diffuse reflectivity (at wavelength of 700 nm) is less than 3% after the irradiation of ultraviolet at center wavelength of 365 nm in air with irradiance of 1 mW/cm$^2$ for 72 hours.

2. The tungsten oxide photocatalyst having titanium oxide and copper ion supported thereon as claimed in claim 1, wherein the support quantity of the copper ion is 0.01 to 0.06 parts by mass in terms of metal (Cu) to 100 parts by mass of tungsten oxide.

3. The tungsten oxide photocatalyst having titanium oxide and copper ion supported thereon as claimed in claim 1, wherein the mass ratio between titanium oxide and copper ion-supporting tungsten oxide is 1:99 to 20:80.

4. The tungsten oxide photocatalyst having titanium oxide and copper ion supported thereon as claimed in claim 1, wherein the type of the titanium oxide crystal is an anatase type or brookite type.

5. The tungsten oxide photocatalyst having titanium oxide and copper ion supported thereon as claimed in claim 1, wherein the titanium oxide supported on the tungsten oxide is 1 to 100 nm in size.

6. A method for producing the tungsten oxide photocatalyst as claimed in claim 1 having titanium oxide and copper ion supported thereon, said method comprising dissolving urea in a solution in which copper-ion supporting tungsten oxide particles are uniformly dispersed in a titanium oxide sol, thermally decomposing the urea to thereby allow the titanium oxide to precipitate on the surface of copper ion-supporting tungsten oxide and to be supported thereon.

7. The method for producing the tungsten oxide photocatalyst having titanium oxide and copper ion supported thereon as claimed in claim 6, wherein the thermal decomposition of urea is performed at 60 to 95° C.

8. The method for producing the tungsten oxide photocatalyst having titanium oxide and copper ion supported thereon as claimed in claim 6, wherein urea is added in an amount of 5 to 20 parts by mass to 100 parts by mass of the copper ion-supporting tungsten oxide particles.

9. The method for producing the tungsten oxide photocatalyst having titanium oxide and copper ion supported thereon as claimed in claim 6, wherein the titanium oxide sol is a water dispersed titanium oxide sol produced by mixing an aqueous solution of titanium tetrachloride and hot water of 60° C. or higher and hydrolyzing the mixture.

10. The method for producing the tungsten oxide photocatalyst having titanium oxide and copper ion supported thereon as claimed claim 6, wherein the titanium oxide supported on the tungsten oxide is 1 to 100 nm in size.

* * * * *